United States Patent [19]

Bolding

[11] 4,013,379
[45] Mar. 22, 1977

[54] WAVE-POWERED PNEUMATIC SYSTEM FOR POWER GENERATION

[76] Inventor: Richard D. Bolding, 2005 Stonehurst, Rialto, Calif. 92376

[22] Filed: Sept. 26, 1974

[21] Appl. No.: 509,333

[52] U.S. Cl. ............................... 417/100; 290/53; 417/330
[51] Int. Cl.² .................... F04B 35/00; F04F 11/00
[58] Field of Search .............. 290/1, 54, 53, 43, 42; 417/330, 331, 332, 333, 334, 335, 336, 337, 240

[56] References Cited

UNITED STATES PATENTS

| | | | |
|---|---|---|---|
| 430,790 | 6/1890 | Starkenberg | 417/240 X |
| 644,869 | 3/1900 | Newell | 417/330 |
| 1,175,287 | 3/1916 | Olmsted | 417/330 |
| 2,044,686 | 6/1936 | Harrison | 417/240 |
| 2,633,289 | 3/1953 | Inman | 417/330 |
| 3,064,137 | 11/1962 | Corbett et al. | 290/43 |
| 3,151,564 | 10/1964 | Rosenberg | 417/330 |
| 3,200,255 | 8/1965 | Masuda | 290/53 |

FOREIGN PATENTS OR APPLICATIONS 1,015,119  12/1965  United Kingdom ................. 290/53

*Primary Examiner*—Robert K. Schaefer
*Assistant Examiner*—John W. Redman
*Attorney, Agent, or Firm*—Herbert E. Kidder

[57] ABSTRACT

A wave-powered pneumatic system for producing compressed air to be used for energy storage or power generation, comprising an elongated seawall extending parallel to the shore and at a distance out from the shore, upon which an air-accumulating structure is built. The air-accumulating structure is divided by partitions into a plurality of modules, each consisting of a plurality of stacked air chambers arranged one above the other. Each of the chambers is relatively shallow in the vertical dimension, and each chamber is closed on all sides except the end facing out to sea. A plenum chamber is connected to each of the air chambers by separate ducts having check valves which allow air to flow into the plenum chamber when pressure within the duct exceeds the pressure in the plenum chamber. The plenum chamber is connected to the air storage or power generating means. Depending upon the wave height, one or more of the chambers will be filled with a solid mass of water from each wave as the latter moves toward shore. This mass of shoreward-moving water acts as a piston, driving the air trapped in the chamber toward the rear end thereof, and compressing it, the compressed air being forced out through the duct to the plenum chamber, and finally to the air-driven power generating means.

4 Claims, 8 Drawing Figures

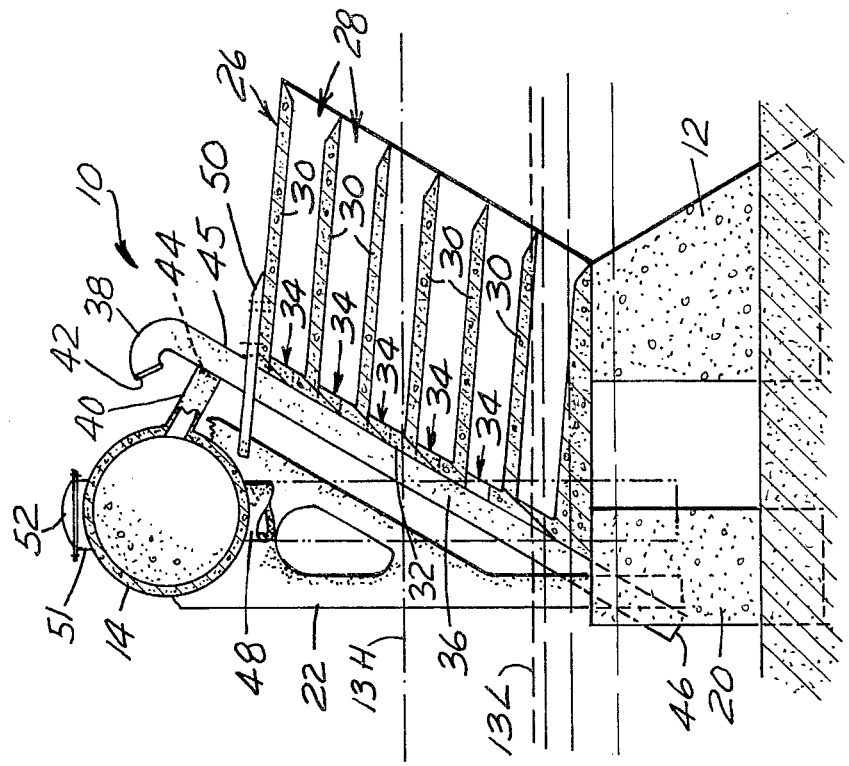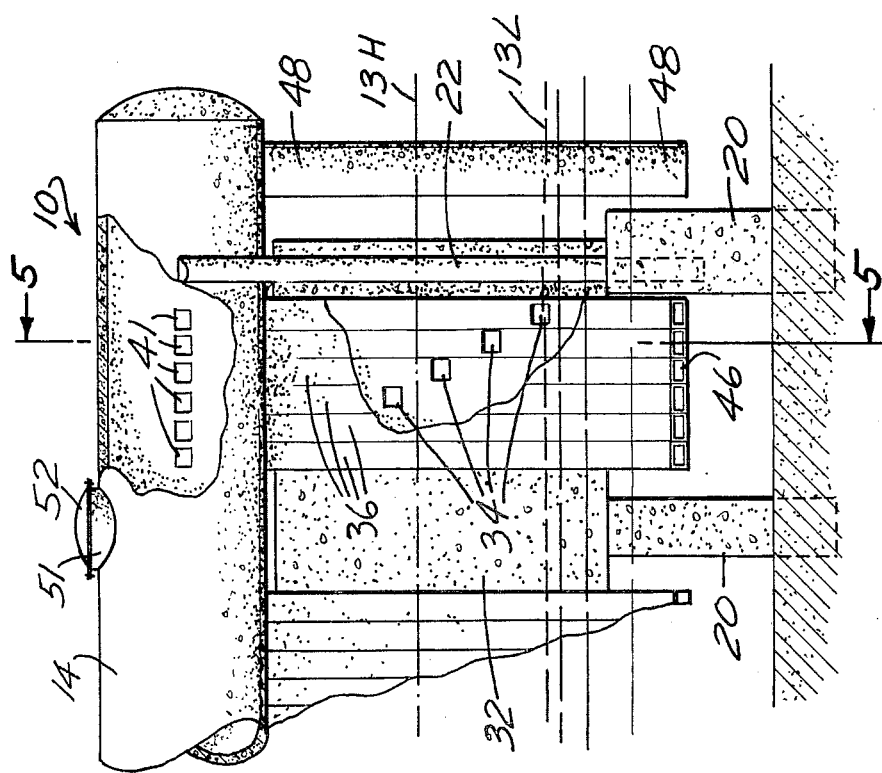

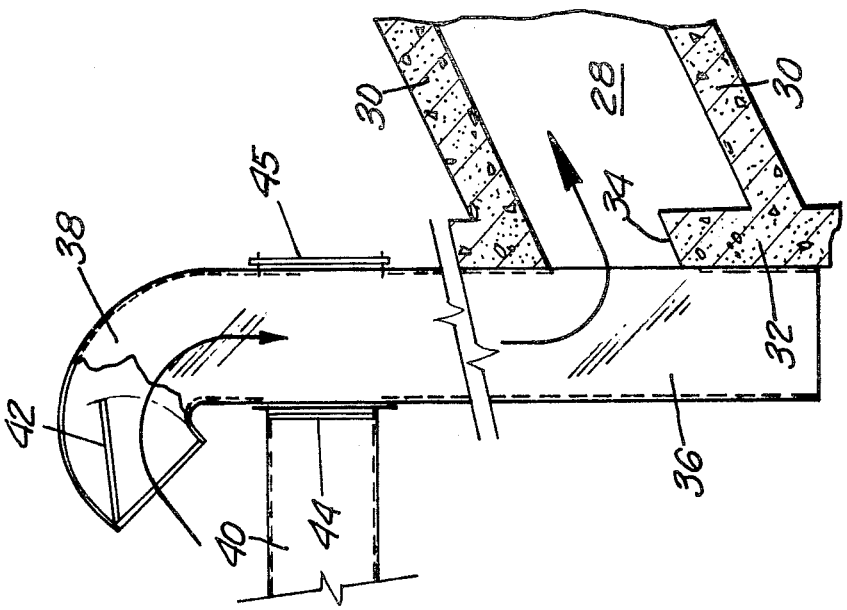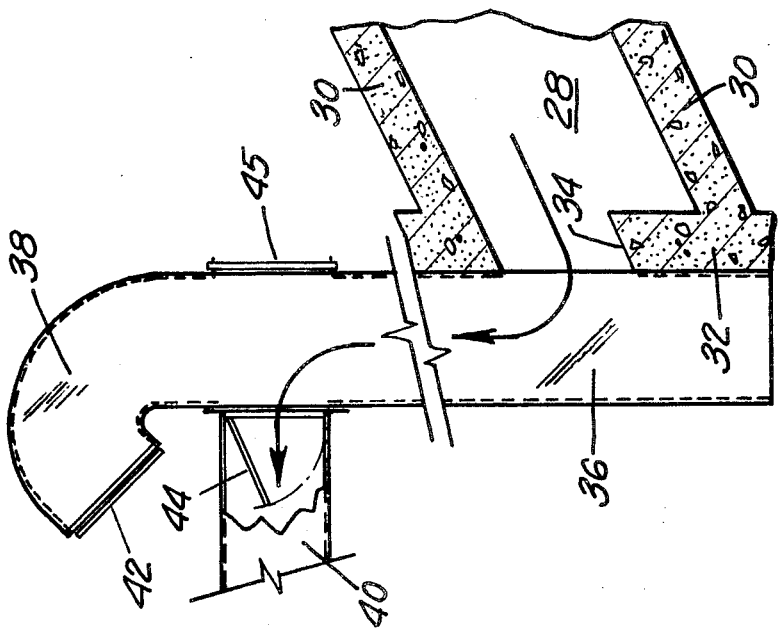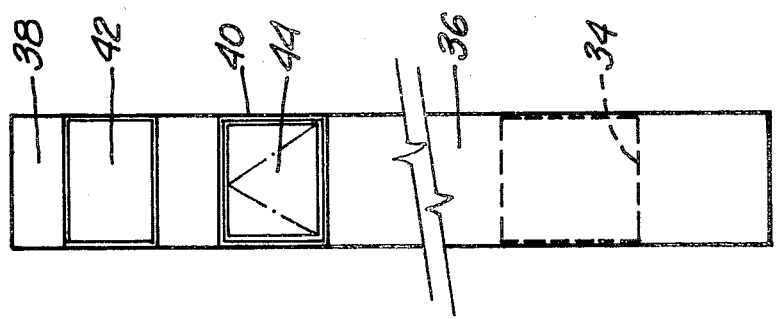

WAVE-POWERED PNEUMATIC SYSTEM FOR POWER GENERATION

SUMMARY OF THE INVENTION

The present invention pertains to pneumatic systems for producing compressed air to be used in generating low-cost, pollution-free electricity or for energy storage, utilizing the energy in ocean waves. The primary object of the invention is to provide apparatus which is so constructed and arranged that air is trapped and compressed by incoming waves, and is discharged into a large plenum chamber, from which it is delivered to an air turbine driving electrical generator, or to an air storage chamber. The invention comprises a series of air-accumulating modules built onto a long seawall extending parallel to the shore and located far enough out in the water to be beyond the point where waves would normally break. Each of the sets of modules comprises a plurality of vertically spaced, horizontal chambers opening out toward the sea, and as the waves roll toward shore, they enter certain of the chambers and drive the air trapped in the chamber ahead of the wave, into a duct having check valves that open into a plenum chamber. The compressed air within the plenum chamber is carried by ducts to an electrical generator on shore, where the air drives a turbine connected to a generator.

One important advantage of the invention is that it utilizes a form of inexhaustible energy that is entirely pollution-free, to generate electrical energy.

Another advantage of the invention is that it utilizes and absorbs the kinetic energy contained in the waves, and thereby reduces the destructive potential of the waves, virtually eliminating erosion of the shores.

These and other objects and advantages of the invention will become apparent to those skilled in the art upon consideration of the following detailed description of the preferred embodiment thereof, with reference to the accompanying drawings.

BRIEF DESCRIPTION OF THE DRAWINGS

FIG. 4 is a fragmentary rear elevational view of one end of the structure shown in FIG. 2;

FIG. 5 is a sectional view taken at 5—5 in FIG. 4;

FIG. 6 is a fragmentary rear view of one of the ducts carrying air from the air-accumulating chambers to the plenum chamber;

FIG. 7 is a partially cut-away side elevation of the duct in FIG. 6; showing air being driven by a wave into the plenum chamber; and FIG. 8 is a view similar to FIG. 7, showing the action of the check valves as they close the plenum chamber and open the intake valve to allow air to be drawn into the duct and chamber as the wave recedes.

DESCRIPTION OF THE PREFERRED EMBODIMENT

Figure 1:
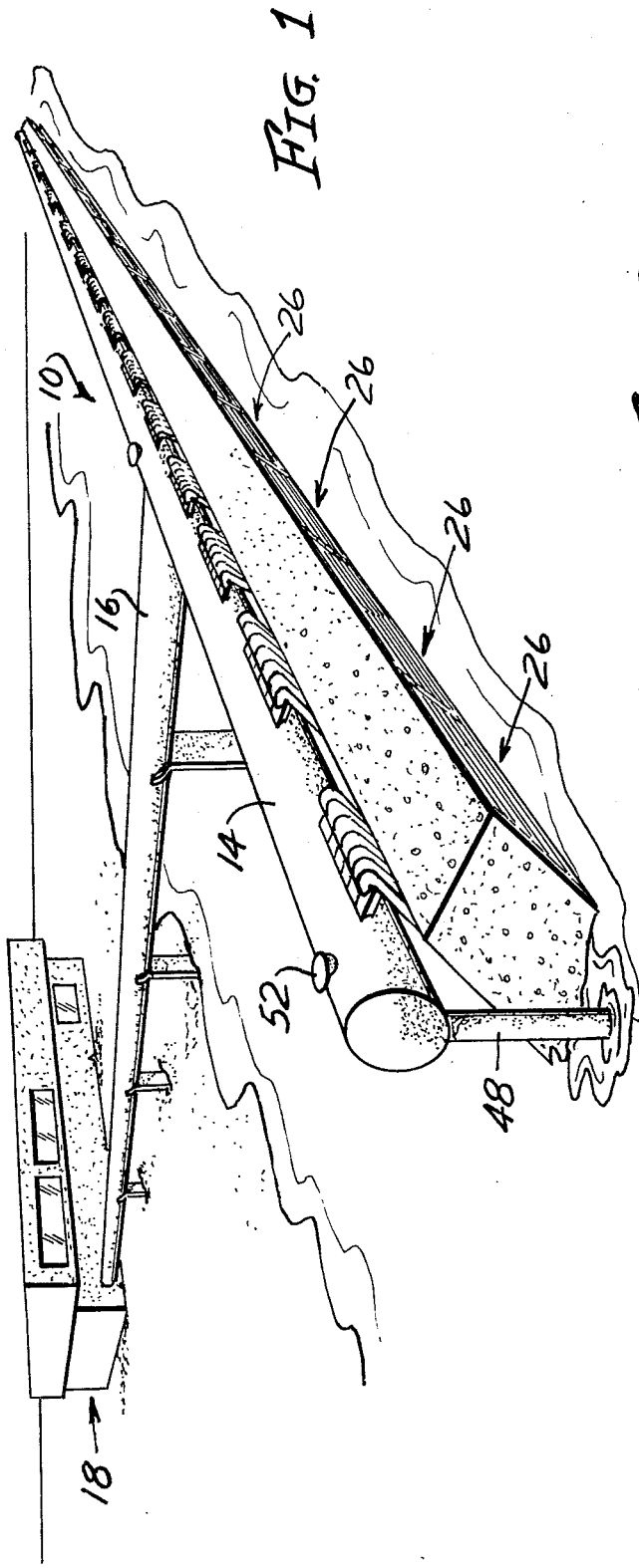
FIG. 1 is a perspective view of the apparatus of the invention, showing the wave-powered pneumatic system, connected by a trunk duct line to a power generating plant on shore.
Figure 2:
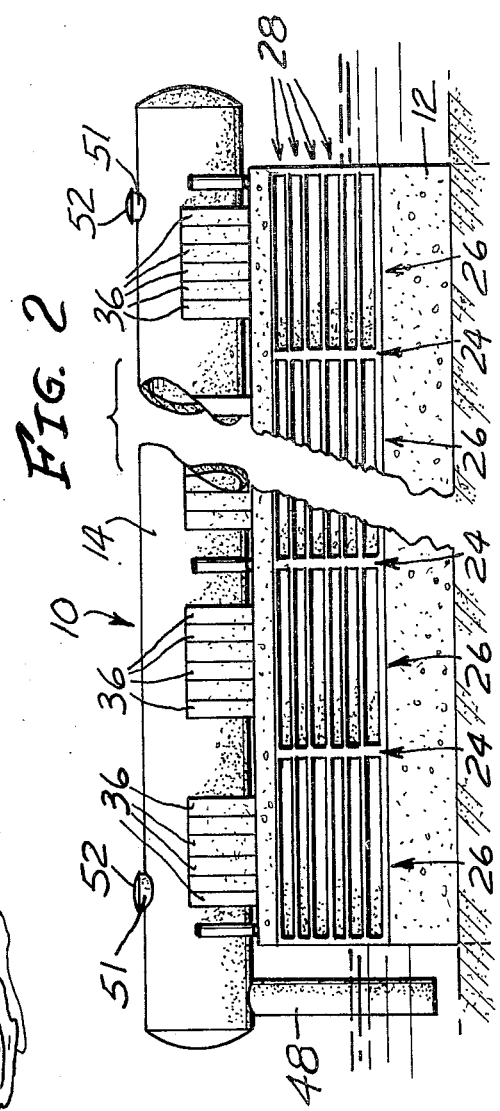
FIG. 2 is a fragmentary front elevational view of the same, as seen from the seaward side.
Figure 3:
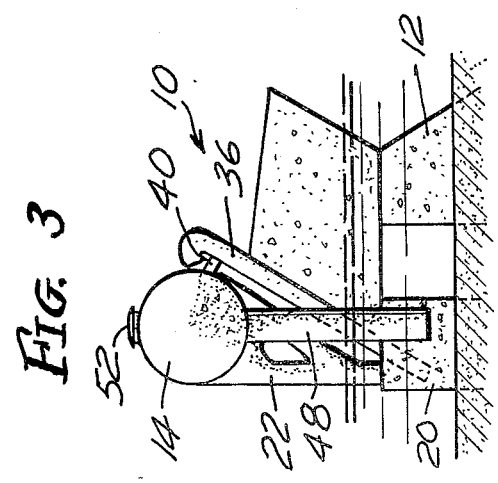
FIG. 3 is an end view of the structure, shown in FIG. 2.

In the drawings, the apparatus of the present invention comprises an air accumulating structure 10 built up on a concrete seawall 12 extending parallel to the shore for a considerable distance, far enough out to insure that it will always be submerged at least two feet at low tide. Preferably, the seawall is located out beyond the depth at which waves normally break, as there is considerable loss of energy in the wave after it breaks. In FIGS. 4 and 5, the water level at high tide is indicated by the reference numeral 13H, and at low tide by reference numeral 13L.

Extending along the length of the seawall structure 10 above and slightly behind the same is a plenum chamber 14, which is connected by a trunk duct line 16 to a power generating plant 18 on shore, housing an air turbine and generators (not shown). Behind the seawall 12, at intervals along the length thereof, are concrete piers 20, which support the back side of the air accumulating structure 19, and some of which also provide bases for concrete pylons 22, that support the plenum chamber 14. Both the plenum chamber 14 and trunk duct line 16 are preferably in the form of large diameter cylindrical pipes of concrete or steel, the said plenum chamber extending the entire length of the air accumulating structure 10.

The air accumulating structure 10 is divided up along its entire length by a number of horizontally spaced, vertical partitions 24, into a plurality of modules 26, each of which consists of a plurality of vertically stacked, horizontal air chambers 28. Each air chamber 28 is defined between a pair of vertically spaced, upwardly and rearwardly inclined, parallel plates 30, the rear ends of which are formed integrally with a forwardly and upwardly inclined rear wall 32. The laterally opposite sides of each chamber 28 are closed by the vertical partitions 24, and the back end of each chamber is closed by a rear wall 32. Each of the air chambers 28 thus forms a closed pocket which faces outwardly toward the sea. As a wave rolls up to the structure 10, the solid body of water drives into one or more of the vertically spaced chambers 28 (depending upon the height of the wave) forming a series of solid water pistons of substantial mass and considerable momentum, that drive the trapped air ahead of them in each chamber.

Each chamber 28 has an exit opening 34 in the rear wall 32, and connected to each exit opening 34 is a separate duct 36 which has a curved top end portion 38 that gives the duct 36, 38 the appearance of a diving snorkel. Near its upper end, each duct 36 has a lateral branch duct 40 that connects with the plenum chamber 14 through an opening 41. As best shown in FIGS. 7 and 8, the curved top end portion 38 of the duct has an inwardly opening, flapper intake valve 42, while the junction of branch duct 40 with duct 36 has an outwardly opening flapper valve 44. FIG. 4 shows that each of the air chambers 28 has its own snorkel tube 36, and there is no duct connection between two separate chambers 28 except for the fact that all the chambers discharge into the common plenum chamber 14. Hinged on the side of each snorkel duct 36 directly opposite the flapper exhaust valve 44 is an inspection and clean-out door 45, through which operating and maintenance personnel can reach to clean away any seaweed or other debris that might interfere with the airtight seal formed by the exhaust valve against its seat.

The bottom end 46 of duct 36 extends down into the water to a considerable depth, and any water that enters the duct 46 drains back into the sea through this opening. A large drain pipe 48 at one end of the plenum chamber 14 also drains off any water that may get into the plenum chamber, and the bottom end 49 of the drain line 48 is likewise submerged to a considerable depth below the surface of the water. In each case the bottom ends of drain pipe 48 and ducts 36 are submerged to a depth such that the air pressure required to blow air out through these openings is greater than the air pressure developed in the ducts and plenum chamber, even at meanslow tide 13L.

For structural strength purposes, the top end of the air accumulating structure 10 is connected by braces 50 to the pylons 22. At intervals along its length, the plenum chamber 14 has manholes 51 covered by hatches 52, through which maintenance personnel can enter the plenum chamber for inspection and servicing.

The operation of the system is as follows: A wave moving toward the shore encounters the air accumulating structure 10 and enters various chambers 28 along the length of the structure, the lowest chambers being entered by virtually all of the smallest waves, and the higher chambers being entered by the larger waves. As each wave rams into the air chamber 28 of its respective module, the solid water of the wave seals the opening and traps the air, filling the chamber ahead of it. The surge of the wave compresses the air, causing the snorkel intake flapper valve 42 to close. When the air in the snorkel tube 36 reaches a pressure greater than that in the air plenum chamber 14, it forces the flapper exhaust valve 44 to open, letting the air into the plenum chamber. When the air in the snorkel has a pressure less than that of the plenum chamber 14, the flapper exhaust valve 44 closes, thus preventing the air from leaving the plenum chamber. As the water in the accumulation chamber 28 starts to recede, it creates a partial vacuum in the snorkel tube 36, causing the flapper intake valve 42 to open. This allows the air to enter the snorkel and chamber 28 through opening 34. This action is repeated each time water leaves the accumulation chamber 28.

When the wave is large enough to fill more than one accumulation chamber 28, the water pours through the opening 34 into the snorkel 36, where it drains out through the bottom end 46. If the entire module should become swamped in time of storm, then the water may enter the plenum chamber 14 through the flapper exhaust valve 44, and if this should occur, the water then drains back into the ocean through the drain pipe 48.

For waves with amplitude $a$ a less than 1/100 of the wave length L, the simple harmonic motion approximation is good. The energy propagates with the group velocity which is half the wave velocity $c$. The power P per unit width perpendicular to the direction of wave propagation is expressed by the equation:

$$P = (\gamma a^2 g T / 8 \pi)$$

where $\gamma = 64$ lbs. per cubic foot; $a = 4$ ft; $g = 32.2$ feet per second per second; and $T = 10$ seconds. Substituting in the above equation, it is seen that $P = 17.85$ KW per foot. The available power in 100 feet of length perpendicular to the direction of wave propagation is 1.785 megawatts.

For long waves of small height ($L/a \geqslant 100$) the wave motion can be treated approximately by the method of geometrical optics. The normal to the wave can be treated in the same manner as a light ray. The angle of reflection of the normal is equal to the angle of incidence of the wall, and the local wave height may be added.

At the points where incoming and reflected wave crests intersect, the amplitude will be approximately doubled. However, the trought of the reflected wave will approximately cancel the crest of the incoming wave. As a result, the crests of waves reaching the plant inlets will be alternately high and low, but the energy per unit length parallel to the wave crests will be increased. The opportunity of concentrating wave power in the plant inlet is attractive.

The progressive waves carry energy toward shore, and this energy is absorbed by the apparatus of the present invention. The sea duct where the incoming waves compress air and force it into the plenum chamber is the most important part of the present invention. The kinetic energy of the waves entering the duct is at least as important as the potential energy in the wave elevation. The water is slowed down by compressing the air ahead of it, and at least for the deeper ducts, it must rise in the vertical portion of the duct to accomplish the air compression.

The plenum chamber is the major means of smoothing the intermittent wave power. Air inside the plenum chamber undergoes adiabatic compression when additional air is forced into the plenum chamber from the sea duct through the flapper valve 44. The air undergoes adiabatic expansion during the portion of the cycle when the flapper valve 44 is closed and air continues to flow through trunk duct line 16 to the power generating plant 18 with its turbines. An estimate of the required plenum volume may be obtained by considering the adiabatic expansion process between the end of the short period that the flapper valve 44 is closed and the next opening. The pressure volume relation for the isentropic process is applied and is expanded in series for small fractional changes of pressure and small fractional volume outflow. The result is that the plenum volume must be 28 times the volume of air pumped by each wave to hold the pressure drop at the turbine inlet over the cycle to five percent. This ratio appears to be consistent with the volumes shown in the drawings.

While the design of the electrical generating plant 18 is no part of the present invention, the following comments and observations are thought to be relevant:

Typical turbine efficiency for single stage axial flow reaction turbines are in the neighborhood of 80% to 85%. A reaction turbine is advantageous because the stage efficiency is much less sensitive to speed ratio than the stage efficiency of an impulse turbine. The efficiency varies by only about 5% over a range of ratio of turbine wheel speed to nozzle velocity of $\pm 40\%$. The use of variable turbine nozzles and/or partial admission may help to maintain a constant turbine speed with a variable plenum pressure. As an aid in smoothing the power output for the system, the turbine may be attached to a large flywheel which, in turn, would be attached to the electrical generator. Increasing the moment of inertia of the flywheel increases the smoothing effect. On the other hand, increased size will increase windage and bearing friction losses, and require a longer time to adjust to new operating conditions.

The requirements on constancy of frequency for alternating current generators attached to large power stations are very stringent. However, if the power is rectified to direct current for long distance transmission, and inverted to alternating current at the far end of the power line, the requirements for constant frequency of generation becomes relatively unimportant.

Recent improvements in rectifiers and inverters made DC power transmission attractive purely as a method of reducing transmission line losses. This is particularly true if the transmission line is to be buried or submerged.

The wave-powered, pneumatic system of the present invention provides a non-polluting, inexhaustible power source, which is independent of scarce low sulfur oil or gas. The fixed costs and operating costs of the plant cannot be determined at this stage of development, but they become increasingly favorable as the cost of fuel rises.

While I have shown and described in considerable detail what I believe to be the preferred form of my invention, it will be understood that the invention is not limited to such details, but may take various other forms within the scope of the following claims.

What I claim is:

1. A wave-powered pneumatic system for producing compressed air to be used for energy storage or power generation, said system comprising, in combination:

a seawall at the edge of the seashore at the point where waves just begin to break, said seawall extending parallel to the shore and having an upwardly and rearwardly inclined surface on the seaward side;

an air-accumulating structure mounted on said seawall and having a plurality of vertically spaced collection chambers, each extending generally parallel to the line of travel of the waves, and each having an entrance opening at the seaward end into which the incoming waves pass, as they reach the said seawall, the inclined seaward face of said seawall acting to direct the waves into the entrances of the collection chambers;

each of said collection chambers having laterally spaced side walls, vertically spaced top and bottom walls, and a rear end wall at the shoreward end of the chamber, said collection chambers being substantially uniform in cross-sectional area from end to end, and said rear end wall being generally perpendicular to the line of travel of the wave as it moves along the collection chamber;

an exit opening through said rear end wall of each of said collection chambers, said exit opening being a relatively small proportion of the total area of the rear end wall;

a plenum chamber extending parallel to said seawall closely adjacent the shoreward side of said air-accumulating structure;

a plurality of ducts, each connected at one end to said exit opening of one of the collection chambers, and at the other end to said plenum chamber, each of said ducts also including a portion extending downwardly from its respective exit opening into the seawater to a depth of submergence sufficient to seal the conduit against loss of air under compression obtained by wave action in the collection chamber, said vertical portion of the duct allowing any water that enters the duct to drain back into the sea; and valve means that allows air to flow in one direction only, from said duct to said plenum chamber, when the air pressure within the duct exceeds the air pressure within the plenum chamber, said valve means allowing atmospheric air to enter said duct when the pressure therein falls to subatmospheric pressure as the wave recedes;

said collection chamber receiving the solid mass of water from each wave as the wave moves toward shore and enters said entrance, said solid mass of water filling said chamber and acting as a piston to drive the air trapped in the chamber toward the rear end thereof, compressing the air and forcing it out through said duct to said plenum chamber, said rear end wall providing a barrier against which the wave dashes to expend its remaining energy before receding back into the sea, and only a small amount of water passing through said restricted exit opening into said duct, where it drains into the sea through said vertical duct portion.

2. A wave-powered pneumatic system as in claim 1, wherein said air accumulating structure is elongated parallel to the shore, and is divided into a plurality of longitudinally spaced air chambers, each of said air chambers being connected to said plenum chamber by a separate air duct and separate check valves.

3. A wave-powered pneumatic system as in claim 1, wherein said air accumulating structure is elongated parallel to the shore and is divided by partition means into a plurality of longitudinally spaced modules, each module comprising a plurality of stacked air chambers arranged one above the other, each of said chambers being relatively shallow in vertical dimension, whereby the lowest air chamber is filled solidly with water by relatively small waves, and successively higher chambers are filled solidly with water by progressively higher waves, each of said chambers having a separate air duct connected to said plenum chamber together with separate check valves, whereby each chamber discharges compressed air directly into said plenum chamber.

4. A wave-powered pneumatic system as in claim 1, which further includes an elongated seawall extending parallel to the shore and at a distance out from the shore;

said air-accumulating structure being built on said seawall along substantially the entire length thereof and rising above the surface of the water;

said air-accumulating structure being divided into a plurality of modules separated from one another by partition means, each module consisting of a plurality of stacked air chambers arranged one above the other; each of said chambers being relatively shallow in vertical dimension, whereby the lowest air chamber is filled solidly with water by relatively small waves, and successively higher chambers being filled solidly by progressively higher waves;

a plurality of vertically extending air ducts located behind each of said modules, each of said air ducts being connected to one of said air chambers, and each duct being connected to said plenum chamber by a branch duct having a check valve that permits air to flow from the duct into the plenum chamber when the air pressure within the duct exceeds that within the plenum chamber; and each of said ducts also having an intake check valve that opens to admit air when the wave starts to recede and air pressure within the duct is lowered to sub-atmospheric pressure.

* * * * *